US012595411B2

(12) United States Patent
Yu et al.

(10) Patent No.: US 12,595,411 B2
(45) Date of Patent: Apr. 7, 2026

(54) SERIES OF ALKALI METAL BOROPHOSPHATES COMPOUNDS, AND ALKALI METAL BOROPHOSPHATES NONLINEAR OPTICAL CRYSTALS AS WELL AS PREPARATION METHOD AND APPLICATION THEREOF

(71) Applicant: TIANJIN UNIVERSITY OF TECHNOLOGY, Tianjin (CN)

(72) Inventors: Hongwei Yu, Tianjin (CN); Haonan Liu, Tianjin (CN); Hongping Wu, Tianjin (CN); Zhanggui Hu, Tianjin (CN)

(73) Assignee: TIANJIN UNIVERSITY OF TECHNOLOGY, Tianjin (CN)

( * ) Notice: Subject to any disclaimer, the term of this patent is extended or adjusted under 35 U.S.C. 154(b) by 860 days.

(21) Appl. No.: 17/957,307

(22) Filed: Sep. 30, 2022

(65) Prior Publication Data

US 2024/0067876 A1     Feb. 29, 2024

(30) Foreign Application Priority Data

Aug. 26, 2022     (CN) ......................... 202211033912.X

(51) Int. Cl.
*C09K 11/71*          (2006.01)
*C01B 35/14*          (2006.01)

(52) U.S. Cl.
CPC ............ *C09K 11/71* (2013.01); *C01B 35/143* (2013.01)

(58) Field of Classification Search
None
See application file for complete search history.

(56) References Cited

U.S. PATENT DOCUMENTS 3,926,649 A * 12/1975 Ray ........................... C03C 3/19
501/48

* cited by examiner

*Primary Examiner* — Stefanie J Cohen
(74) *Attorney, Agent, or Firm* — Leong C. Lei

(57)          ABSTRACT

The present invention relates to compounds and their non-linear optical (NLO) crystals of $A_3B_{11}P_2O_{23}$ (A=K, Rb, Cs, $NH_4$), their producing method and uses thereof. The series of compounds have a chemical formula of $A_3B_{11}P_2O_{23}$ (A=K, Rb, Cs, $NH_4$), which are namely $K_3B_{11}P_2O_{23}$, $Rb_3B_{11}P_2O_{23}$, $Cs_3B_{11}P_2O_{23}$ and $(NH_4)_3B_{11}P_2O_{23}$. The series of NLO crystals having the chemical formula of $A_3B_{11}P_2O_{23}$ (A=K, Rb, Cs, $NH_4$), belong to rhombohedral crystal system, and have a space group of R3, crystal cell parameters of a=b=10.016(5)-12.591(5) Å, c=12.105(6)-14.905(6) Å, Z=3. $A_3B_{11}P_2O_{23}$ (A=K, Rb, Cs, $NH_4$) compounds were prepared by a solid-state reaction method or a hydrothermal method, and $A_3B_{11}P_2O_{23}$ (A=K, Rb, Cs, $NH_4$) NLO crystals were prepared by a high-temperature solid-state reaction method, a hydrothermal method, or a solution method. T They meet the requirements for the frequency conversion of UV wavelength lasers and could be used to prepare nonlinear optical devices.

4 Claims, 2 Drawing Sheets

SERIES OF ALKALI METAL BOROPHOSPHATES COMPOUNDS, AND ALKALI METAL BOROPHOSPHATES NONLINEAR OPTICAL CRYSTALS AS WELL AS PREPARATION METHOD AND APPLICATION THEREOF

CROSS REFERENCE TO RELATED APPLICATION

The present invention relates to alkali metal borophosphates compounds with a chemical formula of $A_3B_{11}P_2O_{23}$ (A=K, Rb, Cs, NH$_4$), alkali metal borophosphate nonlinear optical crystals, a preparation method of the crystals and a nonlinear optical apparatus manufactured from the crystals.

BACKGROUND OF THE INVENTION

Deep-ultraviolet (DUV) coherent lights with wavelengths between 200 and 150 nm are of increasing importance owing to their potential applications in semiconductor photolithography, laser micromachining, modern scientific instruments. For solid-state lasers, the best way to obtain the DUV coherent lights is through the cascaded frequency conversion technology of nonlinear optical (NLO) crystals. However, for an applicable DUV NLO crystal, it must satisfy the following harsh structural and properties' requirements, including i) the non-centrosymmetric (NCS) structures; ii) large second-order NLO coefficients ($d_{ij}$), at least comparable to the $d_{36}$ of KDP; iii) high transparency in the DUV region with the UV cut-off wavelength as short as possible; iv) a moderate birefringence ($\Delta$n=0.05-0.10) to satisfy the phase-matching condition of second-harmonic generation (SHG) in the UV or DUV region; and v) ease of growth, non-toxic, chemical stability, and good mechanical properties. However, since some of the above properties are conflicted, e.g., the materials with large band gaps often exhibit small SHG responses and birefringence, designing and synthesizing a DUV NLO crystal is still a great challenge. Borophosphates with asymmetric [BO$_4$] and [PO$_4$] tetrahedra as basic building blocks usually have large band gaps, and are widely regarded as candidates for exploring UV or DUV optical crystals. Notably, BPO$_4$ has a strong second-harmonic response (2×KDP), and its UV transmittance range extends to about 130 nm. However, its small birefringence of 0.005@1064 nm makes conventional phase matching impossible, and the crystal cannot be used as a UV NLO crystal. However, $\pi$-conjugated [BO$_3$] groups with excellent optical anisotropy are beneficial to improve the birefringence of the material. Therefore, designing and synthesizing borophosphates with [BO$_3$], [BO$_4$] and [PO$_4$] groups are an effective way to design DUV NLO materials.

SUMMARY OF THE INVENTION

The first objective of the present invention is to provide alkali metal borophosphates compounds with a chemical formula of $A_3B_{11}P_2O_{23}$ (A=K, Rb, Cs, NH$_4$). The series of single crystals belong to rhombohedral crystal system, and have a space group of R3, crystal cell parameters of a=b=10.016(5)-12.591(5) Å, c=12.105(6)-14.905(6) Å, Z=3. The polycrystalline powder was prepared through a solid-state reaction method or a hydrothermal method.

Another objective of the present invention is to provide alkali metal borophosphate nonlinear optical crystals and a preparation method thereof. The crystals have a chemical formula of $A_3B_{11}P_2O_{23}$ (A=K, Rb, Cs, NH$_4$), and belong to rhombohedral crystal system, as well as have a space group of R3, crystal cell parameters of a=b=10.016(5)-12.591(5) Å, c=12.105(6)-14.905(6) Å, Z=3. The preparation methods are high-temperature solid-state reaction method, hydrothermal method, and solution method.

Another objective of the present invention is to provide the use of alkali metal borophosphates nonlinear optical apparatus in nonlinear optical devices such as second harmonic generators, up and down frequency converters, optical parametric oscillations, laser frequency conversion devices, and laser communications.

The present invention adopts the following technical solution:

The alkali metal borophosphates provided by the present invention have a chemical formula of $A_3B_{11}P_2O_{23}$ (A=K, Rb, Cs, NH$_4$). The series of single crystals belong to rhombohedral crystal system, and have a space group of R3, crystal cell parameters of a=b=10.016(5)-12.591(5) Å, c=12.105(6)-14.905(6) Å, Z=3. The preparation processes adopt a high-temperature solid-state reaction method, a hydrothermal method or a solution method based on the following steps:

The high-temperature solid-state reaction method is used to prepare nonlinear optical crystals $A_3B_{11}P_2O_{23}$, wherein A=K, Rb, Cs, NH$_4$, comprising the following steps: A mixture of a A-containing compound (A=K, Rb, Cs, NH$_4$), a boron-containing compound, a phosphorus-containing compound was thoroughly ground, and the mixture was preheated to 350-800° C., held at this temperature for a period of time, with several intermediate grindings to get the $A_3B_{11}P_2O_{23}$ (A=K, Rb, Cs, NH$_4$) single phase, wherein element A=K, Rb, Cs, NH$_4$ in the A-containing compound, elemental boron in the boron-containing compound, and elemental phosphorus in the phosphorus-containing compound are in a molar ratio of 2.5-3.5:10.5-11.5:1.5-2.5.

The hydrothermal method is used to prepare nonlinear optical crystals $A_3B_{11}P_2O_{23}$, wherein A=K, Rb, Cs, NH$_4$, comprising the following steps: a. A mixture of a A-containing compound (A=K, Rb, Cs, NH$_4$), a boron-containing compound, a phosphorus-containing compound was combined with deionized water (0.1-50 mL) or mineralizer 0.1-50 g, in which element A=K, Rb, Cs, NH$_4$ in the A-containing compound, elemental boron in the boron-containing compound, and elemental phosphorus in the phosphorus-containing compound are in a molar ratio of 1-4:10-12:1-3;

b. The mixture was loaded into the Teflon-lined autoclave and subsequently sealed;

c. The autoclave was heated to 120-330° C., held at this temperature for a period of time, and then cooled to room temperature;

d. Open the autoclave and filter the solution containing crystals to obtain transparent alkali metal borophosphates nonlinear optical crystals.

The solution method is used to prepare $A_3B_{11}P_2O_{23}$, wherein A=K, Rb, Cs, NH$_4$ nonlinear optical crystals, comprising the following steps: A mixture of a A-containing compound (A=K, Rb, Cs, NH$_4$), a boron-containing compound, a phosphorus-containing compound, and deionized water (0.1-400 mL) was placed in a beaker and stirred until dissolved completely. Then put the beaker on the heating table and heat it to 25-400° C. After a period of time, the series of alkali metal borophosphates nonlinear optical crystals are obtained. In order to further grow them, the seed crystals of the series of nonlinear optical crystals were suspended in solution with fine platinum wires. In order to reduce the evaporation of water, the beaker is covered with a layer of polyethylene plate and pierced with dozens of millimeter sized holes. After a period of time, take out the centimeter size alkali metal borophosphates nonlinear optical crystals from the solution.

The alkali metal borophosphates compounds provided by the present invention have a chemical formula of $A_3B_{11}P_2O_{23}$ (A=K, Rb, Cs, $NH_4$), which are namely $K_3B_{11}P_2O_{23}$, $Rb_3B_{11}P_2O_{23}$, $Cs_3B_{11}P_2O_{23}$, $(NH_4)_3B_{11}P_2O_{23}$, and the formula weights are 666.15, 805.26, 947.57, and 602.97, respectively. The series of alkali metal borophosphates compounds can be prepared by a high-temperature solid-state reaction method, a hydrothermal method, or a solution method based on the following chemical reaction formulas:

1) $3A_2CO_3$ (A=K, Rb, Cs, $NH_4$)+$22H_3BO_3$+ $4NH_4H_2PO_4 \rightarrow 2A_3B_{11}P_2O_{23}$ (A=K, Rb, Cs, $NH_4$)+ $39H_2O\uparrow+3CO_2\uparrow+4NH_3\uparrow$ 2) $3AOH$ (A=K, Rb, Cs, $NH_4$)+$11H_3BO_3$+ $P_2O_5 \rightarrow A_3B_{11}P_2O_{23}$ (A=K, Rb, Cs, $NH_4$)+$18H_2O\uparrow$ 3) $3A_2CO_3$ (A=K, Rb, Cs, $NH_4$)+$22H_3BO_3$+ $2P_2O_5 \rightarrow 2A_3B_{11}P_2O_{23}$ (A=K, Rb, Cs, $NH_4$)+$33H_2O\uparrow$+ $3CO_2\uparrow$ 4) $3A_2O$ (A=K, Rb, Cs, $NH_4$)+$22H_3BO_3$+ $2P_2O_5 \rightarrow 2A_3B_{11}P_2O_{23}$ (A=K, Rb, Cs, $NH_4$)+$33H_2O\uparrow$ 5) $3AF$ (A=K, Rb, Cs, $NH_4$)+$11H_3BO_3$+ $2NH_4H_2PO_4 \rightarrow A_3B_{11}P_2O_{23}$ (A=K, Rb, Cs, $NH_4$)+$18$ $H_2O\uparrow+3HF\uparrow+2NH_3\uparrow$ 6) $3A_2CO_3$ (A=K, Rb, Cs, $NH_4$)+$11B_2O_3$+ $4NH_4H_2PO_4 \rightarrow 2A_3B_{11}P_2O_{23}$ (A=K, Rb, Cs, $NH_4$)+ $6H_2O\uparrow+3CO_2\uparrow+4NH_3\uparrow$ 7) $3A_2CO_3$ (A=K, Rb, Cs, $NH_4$)+$11B_2O_3$+ $2P_2O_5 \rightarrow 2A_3B_{11}P_2O_{23}$ (A=K, Rb, Cs, $NH_4$)+$3CO_2\uparrow$ 8) $3AH_2PO_4$ (A=K, Rb, Cs, $NH_4$)+ $5.5B_2O_3 \rightarrow A_3B_{11}P_2O_{23}$ (A=K, Rb, Cs, $NH_4$)+ $1.5H_2O\uparrow+H_3PO_4$ 9) $3A_2HPO_4$ (A=K, Rb, Cs, $NH_4$)+$11B_2O_3$+ $0.5P_2O_5 \rightarrow 2A_3B_{11}P_2O_{23}$ (A=K, Rb, Cs, $NH_4$)+ $1.5H_2O\uparrow$ 10) $6AOH$ (A=K, Rb, Cs, $NH_4$)+$11B_2O_3$+ $2P_2O_5 \rightarrow 2A_3B_{11}P_2O_{23}$ (A=K, Rb, Cs, $NH_4$)+$3H_2O\uparrow$ 11) $12AH_2PO_4$ (A=K, Rb, Cs, $NH_4$)+$22H_3B_2O_3$+ $2P_2O_5 \rightarrow 4A_3B_{11}P_2O_{23}$ (A=K, Rb, Cs, $NH_4$)+$33H_2\uparrow$+ $8H_3PO_4$ 12) $6ACl$ (A=K, Rb, Cs, $NH_4$)+$11B_2O_3$+ $4NH_4H_2PO_4 \rightarrow 2A_3B_{11}P_2O_{23}$ (A=K, Rb, Cs, $NH_4$)+ $6HCl\uparrow+4NH_3\uparrow+3H_2O\uparrow$ 13) $6ACl$ (A=K, Rb, Cs, $NH_4$)+$22H_3BO_3$+ $2P_2O_5 \rightarrow 2A_3B_{11}P_2O_{23}$ (A=K, Rb, Cs, $NH_4$)+$6HCl\uparrow$+ $30H_2O\uparrow$ The alkali metal borophosphates nonlinear optical crystals provided by the present invention are characterized in that the crystals have a chemical formula of $A_3B_{11}P_2O_{23}$ (A=K, Rb, Cs, $NH_4$), and belong to rhombohedral crystal system, as well as have a space group of R3, crystal cell parameters of a=b=10.016(5)-12.591(5) Å, c=12.105(6)-14.905(6) Å, Z=3.

The alkali metal borophosphates nonlinear optical crystals provided by the present invention adopt a high-temperature solid-state reaction method, a hydrothermal method or a solution method based on the following specific operation steps:

The high-temperature solid-state reaction method is used to prepare $A_3B_{11}P_2O_{23}$, wherein A=K, Rb, Cs, $NH_4$ nonlinear optical crystals, comprising the following steps:

a. Uniformly mixed the compound alkali metal borophosphates single-phase polycrystalline powder with the fluxing agents, and heated it to a temperature of 350-

800° C., and kept it at a constant temperature for a period of time to obtain a mixed melt, and then cooled to 300-750° C., in which the molar ratios of the compound alkali metal borophosphates single-phase polycrystalline powder to the fluxing agents are 1:0-20;

Or directly heat the mixture of a A-containing compound (A=K, Rb, Cs, $NH_4$), a boron-containing compound, and a phosphorus-containing compound or the mixture of a A-containing compound (A=K, Rb, Cs, $NH_4$), a boron-containing compound, a phosphorus-containing compound and the fluxing agents to 350-800° C., and held at this temperature for a period of time to obtain a mixed melt. And then cooled to a temperature of 300-750° C., in which the molar ratios of a A-containing compound (A=K, Rb, Cs, $NH_4$), a boron-containing compound and a phosphorus-containing compound to the fluxing agents are 2.5-3.5:10.5-11.5:1.5-2.5:0-20;

The fluxing agents mainly include at least one or more of alkali metal salts, i.e., alkali metal carbonates, alkali metal nitrates, alkali metal sulfates, alkali metal oxalates, alkali metal borates, alkali metal phosphates, alkali metal halides, alkali metal fluoroborates, alkali metal metaborates, and alkali metal oxides, alkali metal hydroxides, and monohydrogen phosphates, dihydrogen phosphates, boron oxide, boric acid, phosphoric acid, lead oxide, lead fluoride, molybdenum oxide, bismuth oxide.

The compound alkali metal borophosphates single-phase polycrystalline powder are prepared by a solid-state method, including the following steps: mixing a A-containing compound (A=K, Rb, Cs, $NH_4$), a boron-containing compound and a phosphorus-containing compound by a solid-state method to obtain the compound alkali metal borophosphates. The element A=K, Rb, Cs, $NH_4$ in the A-containing compound, the element boron in the boron-containing compound, and the element phosphorus in the phosphorus-containing compound are in a molar ratio of 2.5-3.5:10.5-11.5:1.5-2.5, and the raw materials of the A-containing compound (A=K, Rb, Cs, $NH_4$), the boron-containing compound and the phosphorus-containing compound are mixed uniformly. After grinding, the mixture was preheated to remove moisture and gas, and then cool to room temperature.

Further, the mixture was gradually heated to 350-800° C., held at this temperature for a period of time. The alkali metal borophosphates compounds single-phase polycrystalline powder are obtained.

b. Preparation of alkali metal borophosphates seed crystals: the mixture obtained in step a. is slowly cooled to room temperature, and spontaneously crystallized to obtain alkali metal borophosphate seeds;

c. A seed crystal of $A_3B_{11}P_2O_{23}$ (A=K, Rb, Cs, $NH_4$) was attached with Pt wire to a Pt rod. After being preheated above the solution surface, the seed was introduced into the melt, and held at this temperature for a period of time, the temperature of the furnace was lowered quickly to the initial crystallization temperature.

d. Continue to cool down slowly, and rotate the seed crystal rod to grow the crystal. When the growth was completed, the crystal was drawn out of the melt surface, and the temperature dropped to room temperature, and then obtain the alkali metal borophosphates nonlinear optical crystals.

The hydrothermal method is used to prepare $A_3B_{11}P_2O_{23}$, wherein A=K, Rb, Cs, $NH_4$ nonlinear optical crystals, comprising the following steps:

a. A mixture of a A-containing compound (A=K, Rb, Cs, $NH_4$), a boron-containing compound, a phosphorus-containing compound was combined with deionized water (0.1-50 mL) or mineralizer 0.1-50 g, in which element A=K, Rb, Cs, $NH_4$ in the A-containing compound, elemental boron in the boron-containing compound, and elemental phosphorus in the phosphorus-containing compound are in a molar ratio of 2-4:10-12:1-3;

b. The mixture was loaded into Teflon-lined autoclave and subsequently sealed;

c. The autoclave was heated to 120-330° C., held at this temperature for a period of time, and then cooled to room temperature;

d. Open the autoclave and filter the solution containing crystals to obtain a transparent alkali metal borophosphates nonlinear optical crystals.

The solution method is used to prepare $A_3B_{11}P_2O_{23}$, wherein A=K, Rb, Cs, $NH_4$ nonlinear optical crystals, comprising the following steps:

A mixture of a A-containing compound (A=K, Rb, Cs, $NH_4$), a boron-containing compound, a phosphorus-containing compound, and deionized water (0.1-400 mL) was placed in a beaker and stirred until dissolved completely. Then put the beaker on the heating table and heat it to 25-400° C. After a period of time, a series of alkali metal borophosphates nonlinear optical crystals are obtained. In order to further grow them, the seed crystals of the series of crystals were suspended in solution with fine platinum wires. In order to reduce the evaporation of water, the beaker is covered with a layer of polyethylene plate and pierced with dozens of millimeter sized holes. After a period of time, take out a centimeter size alkali metal borophosphates nonlinear optical crystals from the solution.

The alkali metal borophosphates crystals have the advantages of high purity, easy crystal growth, transparent and no package, fast growth speed, low cost and easy to obtain large-size crystals; the obtained crystals have the advantages of wide light transmission band, high hardness, good mechanical properties, not easy to break and deliquescence, and easy to process and preserve. The nonlinear optical device made of the series of alkali metal borophosphates nonlinear optical crystals obtained by the method of the invention in manufacturing a nonlinear optical device comprising means for generating at least one output radiation with a frequency different from that of the incident electromagnetic radiation after passing at least one beam of incident electromagnetic radiation through at least one nonlinear optical crystal, wherein the nonlinear optical crystal is $A_3B_{11}P_2O_{23}$, in which A=K, Rb, Cs, $NH_4$, and the molecular formula are $K_3B_{11}P_2O_{23}$, $Rb_3B_{11}P_2O_{23}$, $Cs_3B_{11}P_2O_{23}$, and $(NH_4)_3B_{11}P_2O_{23}$, respectively.

DETAILED DESCRIPTION OF THE PREFERRED EMBODIMENTS

Figure 1:
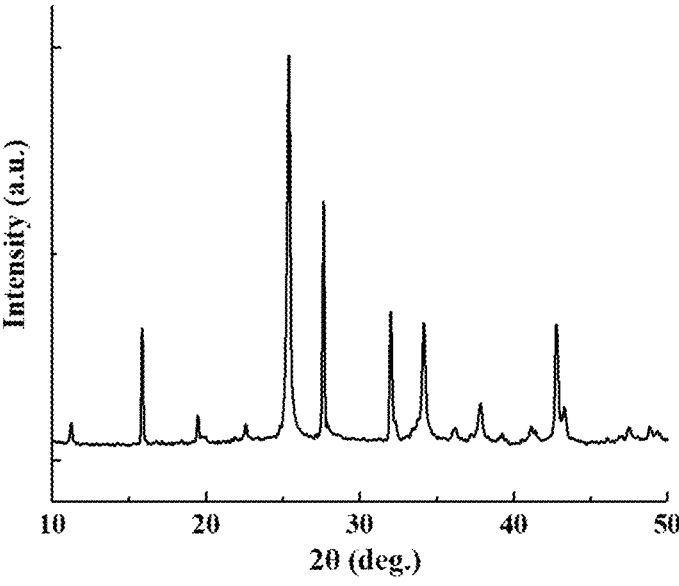
FIG. 1 is an X-ray powder diffraction pattern of a compound $Rb_3B_{11}P_2O_{23}$ of the present invention.
Figure 2:
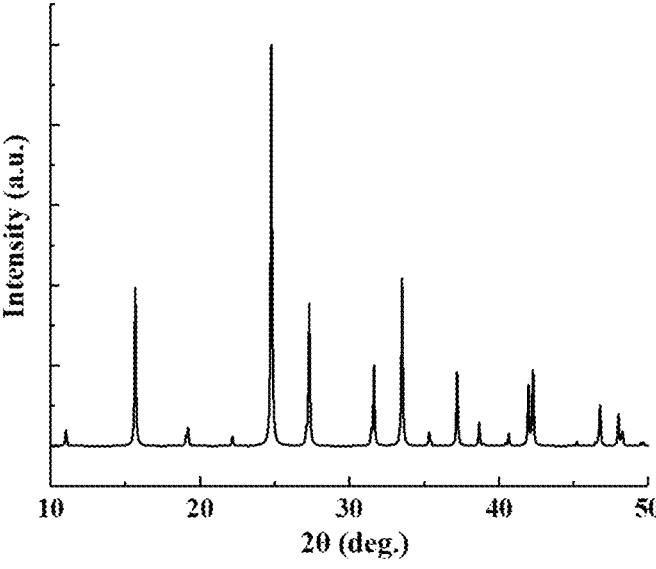
FIG. 2 is an X-ray powder diffraction pattern of a compound $Cs_3B_{11}P_2O_{23}$ of the present invention.
Figure 3:
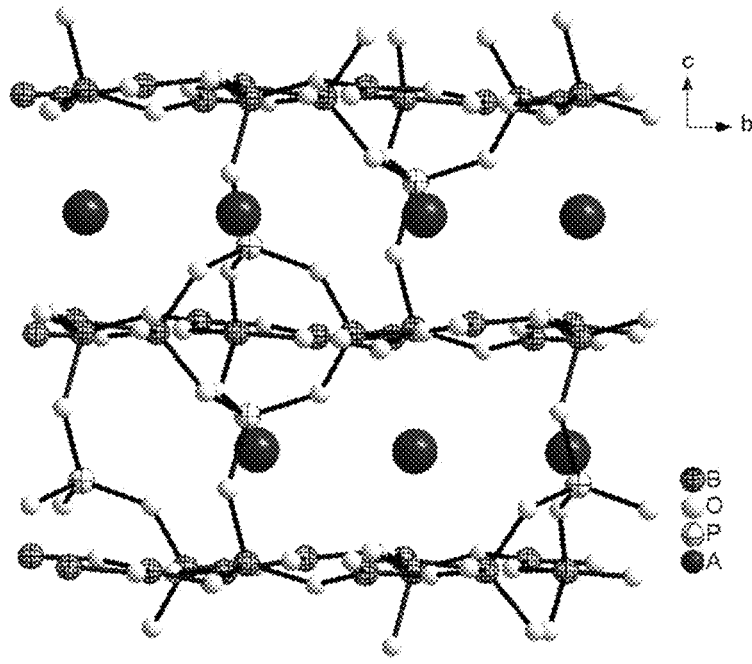
FIG. 3 is a structural diagram of a $A_3B_{11}P_2O_{23}$ (A=K, Rb, Cs, $NH_4$) crystal of the present invention.

The present invention is described above through specific embodiments, but the invention is not limited to these embodiments.

Embodiment 1

$A_3B_{11}P_2O_{23}$ (A=K, Rb, Cs, $NH_4$) polycrystalline powder was prepared according to a reaction formula: $3A_2CO_3$ (A=K, Rb, Cs, $NH_4$)+$22H_3BO_3$+$4NH_4H_2PO_4 \rightarrow 2A_3B_{11}P_2O_{23}$ (A=K, Rb, Cs, $NH_4$)+$39H_2O\uparrow$+$3CO_2\uparrow$+$4NH_3\uparrow$ as follows:

Reagents were weighed according to stoichiometric proportion and were put in a mortar, and then mixed and ground carefully. The mixture was put in a lidless corundum crucible of size of (100 mm×100 mm. The said crucible was put into a muffle furnace, heated to 350° C. slowly and held at this temperature for 24 hours. After being cooled down, the loose and porous sample was taken out of the crucible and was once again mixed thoroughly, ground and put back to the crucible and compacted. The mixture was heated at 550° C. for 24 h and cooled to room temperature. The sample was then taken out and ground thoroughly, and the mixture was put back to the crucible and heated at 550° C. for 48 h. The product was analyzed by the powder X-ray diffraction of the product, where the X-ray diffraction pattern was consistent with a theoretical X-ray diffraction pattern of $A_3B_{11}P_2O_{23}$ (A=K, Rb, Cs, $NH_4$) analyzed by a single-crystal structure.

Then, the single-phase polycrystalline powder was put into a (80 mm×80 mm lidless platinum crucible which was placed in the center of a vertical, programmable temperature furnace, was heated at 850° C. until the melt became transparent and clear, held at this temperature for 15 h, and then quickly cooled to the initial crystallization temperature (650° C.). Then, a platinum wire was promptly dipped into the solution. The temperature was decreased at a rate of 0.5° C./h, then the platinum wire was pulled out of the solution, and allowed to cool to room temperature at a rate of 10° C./h.

Thus, a few colorless, transparent plate crystals crystallized on the platinum wire. The obtained crystals could be used as seeds. A seed crystal of $A_3B_{11}P_2O_{23}$ (A=K, Rb, Cs, $NH_4$) was attached with Pt wire to a Pt rod and then suspended on solution at 600° C. for a quarter. The seed crystal was kept at this temperature in solution for half an hour while rotating at a rate of 10 rpm. The temperature of the furnace was first lowered quickly to 550° C. and then lowered at a rate of 2° C./day. After the growth of crystal ended, the crystal was lifted out of liquid surface. The temperature of the crystal was then lowered to room temperature at a rate of 10° C./h. As a result, transparent $A_3B_{11}P_2O_{23}$ (A=K, Rb, Cs, $NH_4$) crystal with a size of 56 mm×40 mm×30 mm was obtained.

Embodiment 2

$A_3B_{11}P_2O_{23}$ (A=K, Rb, Cs, $NH_4$) polycrystalline powder was prepared according to a reaction formula: $3AOH$ (A=K, Rb, Cs, $NH_4$)+$11H_3BO_3$+$P_2O_5 \rightarrow A_3B_{11}P_2O_{23}$ (A=K, Rb, Cs, $NH_4$)+$18H_2O\uparrow$ as follows:

Reagents were weighed according to stoichiometric proportion, preparation of $A_3B_{11}P_2O_{23}$ (A=K, Rb, Cs, $NH_4$) crystal by fluxing agent method: AOH (A=K, Rb, Cs, $NH_4$)—$P_2O_5$ as the fluxing agent system, the said reagents are used as the solute with the molar ratio of solute:fluxing agent=1:4, the molar ratio of AOH (A=K, Rb, Cs, $NH_4$)/$P_2O_5$ was selected at 3/5. Then, mixed the said reagents with fluxing agent and put into a $\Phi$ 80 mm×80 mm lidless platinum crucible which was placed in the center of a vertical, programmable temperature furnace, was heated at 800° C., held at this temperature for 60 h, and then quickly cooled to the initial crystallization temperature (750° C.).

The temperature was decreased to room temperature at a rate of 1.5° C./h to obtain the seeds.

A seed crystal of $A_3B_{11}P_2O_{23}$ (A=K, Rb, Cs, $NH_4$) was attached with Pt wire to a Pt rod and then suspended on solution at 700° C. for ten minutes. The seed crystal was kept at this temperature in solution for half an hour while rotating at a rate of 10 rpm. The temperature of the furnace was first lowered quickly to 600° C. and then lowered at a rate of 1° C./day. After the growth of crystal ended, the crystal was lifted out of liquid surface. The temperature of the crystal was then lowered to room temperature at a rate of 20° C./h. As a result, transparent $A_3B_{11}P_2O_{23}$ (A=K, Rb, Cs, $NH_4$) crystal with a size of 36 mm×22 mm×15 mm was obtained.

Embodiment 3

$A_3B_{11}P_2O_{23}$ (A=K, Rb, Cs, $NH_4$) polycrystalline powder was prepared according to a reaction formula: $3A_2CO_3$ (A=K, Rb, Cs, $NH_4$)+$22H_3BO_3$+$2P_2O_5 \rightarrow 2A_3B_{11}P_2O_{23}$ (A=K, Rb, Cs, $NH_4$)+$33H_2O\uparrow$+$3CO_2\uparrow$ as follows:

The said polycrystalline $A_3B_{11}P_2O_{23}$ (A=K, Rb, Cs, $NH_4$) is used as the solute with the molar ratio of solute:fluxing agent ($H_3BO_3$—$P_2O_5$)=1:3. Then, mixed homogeneously and put into a $\Phi$ 80 mm×80 mm lidless platinum crucible which was placed in the center of a vertical, programmable temperature furnace, was heated at 350° C. until the melt became transparent and clear, held at this temperature for 60 h, and then quickly cooled to the initial crystallization temperature (330° C.).

The temperature was decreased to room temperature at a rate of 3.5° C./h to obtain the seeds.

A seed crystal of $A_3B_{11}P_2O_{23}$ (A=K, Rb, Cs, $NH_4$) was attached with Pt wire to a Pt rod and then suspended on solution for 15 minutes. The seed crystal was kept at this temperature in solution for twenty minutes while rotating at a rate of 5 rpm. The temperature of the furnace was first lowered quickly to 315° C. and then lowered at a rate of 3° C./day.

After the growth of crystal ended, the crystal was lifted out of liquid surface. The temperature of the crystal was then lowered to room temperature at a rate of 1° C./h. As a result, transparent $A_3B_{11}P_2O_{23}$ (A=K, Rb, Cs, $NH_4$) crystal with a size of 25 mm×24 mm×10 mm was obtained.

Embodiment 4

$A_3B_{11}P_2O_{23}$ (A=K, Rb, Cs, $NH_4$) polycrystalline powder was prepared according to a reaction formula: $3A_2O$ (A=K, Rb, Cs, $NH_4$)+$22H_3BO_3$+$2P_2O_5 \rightarrow 2A_3B_{11}P_2O_{23}$ (A=K, Rb, Cs, $NH_4$)+$33H_2O\uparrow$ as follows:

a. Reagents were weighed according to stoichiometric proportion, and loaded into a 21 mL Teflon-lined autoclave, further added 3 mL deionized water to obtain the mixed liquid.

b. The mixture was loaded into Teflon-lined autoclave and subsequently sealed;

c. The autoclave was heated to 120° C. at a rate of 20° C./h, held at this temperature for 5 days, and then cooled to room temperature at a rate of 4° C./h;

d. Open the autoclave and filter the solution containing crystals to obtain a transparent alkali metal borophosphates compounds.

Embodiment 5

$A_3B_{11}P_2O_{23}$ (A=K, Rb, Cs, $NH_4$) polycrystalline powder was prepared according to a reaction formula: 3AF (A=K, Rb, Cs, $NH_4$)+$11H_3BO_3$+$2NH_4H_2PO_4 \rightarrow A_3B_{11}P_2O_{23}$ (A=K, Rb, Cs, $NH_4$)+$18 H_2O\uparrow$+$3HF\uparrow$+$2NH_3\uparrow$ as follows:

a. Reagents were weighed according to stoichiometric proportion, and loaded into a 150 mL Teflon-lined autoclave, further added 50 mL deionized water to obtain the mixed liquid.

b. The mixture was loaded into Teflon-lined autoclave and subsequently sealed;

c. The autoclave was heated to 330° C. at a rate of 10° C./h, held at this temperature for 10 days, and then cooled to room temperature at a rate of 3° C./h;

d. Open the autoclave and filter the solution containing crystals to obtain a transparent alkali metal borophosphates compounds.

Embodiment 6

$A_3B_{11}P_2O_{23}$ (A=K, Rb, Cs, $NH_4$) polycrystalline powder was prepared according to a reaction formula: $3A_2CO_3$ (A=K, Rb, Cs, $NH_4$)+$11B_2O_3$+$4NH_4H_2PO_4 \rightarrow 2A_3B_{11}P_2O_{23}$ (A=K, Rb, Cs, $NH_4$)+$6H_2O\uparrow$+$3CO_2\uparrow$+$4NH_3\uparrow$ as follows:

Reagents were weighed according to stoichiometric proportion, and then the mixture was placed in a beaker (10 mL), further add 0.1 mL deionized water into the beaker and stirred until dissolved completely. Then put the beaker on the heating table and heat it to 25° C. After 2 days, the series of alkali metal borophosphates nonlinear optical crystals are obtained. In order to further grow them, the seed crystals of the series of crystals were suspended in solution with fine platinum wires. In order to reduce the evaporation of water, the beaker is covered with a layer of polyethylene plate and pierced with dozens of millimeter sized holes. After 3 weeks, take out a centimeter size alkali metal borophosphates nonlinear optical crystals from the solution.

Embodiment 7

$A_3B_{11}P_2O_{23}$ (A=K, Rb, Cs, $NH_4$) polycrystalline powder was prepared according to a reaction formula: $3A_2CO_3$ (A=K, Rb, Cs, $NH_4$)+$11B_2O_3$+$2P_2O_5 \rightarrow 2A_3B_{11}P_2O_{23}$ (A=K, Rb, Cs, $NH_4$)+$3CO_2\uparrow$ as follows:

Reagents were weighed according to stoichiometric proportion, and then the mixture was placed in a beaker (1000 mL), further add 400 mL deionized water into the beaker and stirred until dissolved completely. Then put the beaker on the heating table and heat it to 400° C. After 7 days, the series of alkali metal borophosphates nonlinear optical crystals are obtained. In order to further grow them, the seed crystals of the series of crystals were suspended in solution with fine platinum wires. In order to reduce the evaporation of water, the beaker is covered with a layer of polyethylene plate and pierced with dozens of millimeter sized holes. After 5 weeks, take out a centimeter size alkali metal borophosphate nonlinear optical crystal from the solution.

Embodiment 8

$A_3B_{11}P_2O_{23}$ (A=K, Rb, Cs, $NH_4$) polycrystalline powder was prepared according to a reaction formula: $3AH_2PO_4$ (A=K, Rb, Cs, $NH_4$)+5.5$B_2O_3$→$A_3B_{11}P_2O_{23}$ (A=K, Rb, Cs, $NH_4$)+1.5$H_2O\uparrow$+$H_3PO_4$ as follows:

Reagents were weighed according to stoichiometric proportion, preparation of $A_3B_{11}P_2O_{23}$ (A=K, Rb, Cs, $NH_4$) crystal by fluxing agent method: AOH (A=K, Rb, Cs, $NH_4$)—PbO as the fluxing agent system, the said reagents are used as the solute with the molar ratio of solute:fluxing agent=4:7, the molar ratio of AOH (A=K, Rb, Cs, $NH_4$)/PbO was selected at 1/6. Then, mixed the said reagents with fluxing agent and put into a Φ80 mm×80 mm lidless platinum crucible which was placed in the center of a vertical, programmable temperature furnace, was heated at 350° C., held at this temperature for 60 h, and then quickly cooled to the initial crystallization temperature (330° C.).

The temperature was decreased to room temperature at a rate of 3.5° C./h to obtain the seeds.

A seed crystal of $A_3B_{11}P_2O_{23}$ (A=K, Rb, Cs, $NH_4$) was attached with Pt wire to a Pt rod and then suspended on solution at 330° C. for 15 minutes. The seed crystal was kept at this temperature in solution for half an hour while rotating at a rate of 10 rpm. The temperature of the furnace was first lowered quickly to 315° C. and then lowered at a rate of 3° C./day. After the growth of crystal ended, the crystal was lifted out of liquid surface. The temperature of the crystal was then lowered to room temperature at a rate of 1° C./h. As a result, transparent $A_3B_{11}P_2O_{23}$ (A=K, Rb, Cs, $NH_4$) crystal with a size of 25 mm×24 mm×10 mm was obtained.

Embodiment 9

$A_3B_{11}P_2O_{23}$ (A=K, Rb, Cs, $NH_4$) polycrystalline powder was prepared according to a reaction formula: 3$A_2HPO_4$ (A=K, Rb, Cs)+11$B_2O_3$+0.5$P_2O_5$→2$A_3B_{11}P_2O_{23}$ (A=K, Rb, Cs, $NH_4$)+1.5$H_2O\uparrow$ as follows:

Reagents were weighed according to stoichiometric proportion, preparation of $A_3B_{11}P_2O_{23}$ (A=K, Rb, Cs, $NH_4$) crystal by fluxing agent method: $A_2CO_3$ (A=K, Rb, Cs, $NH_4$)—$H_3BO_3$—$NH_4H_2PO_4$ as the fluxing agent system, the said reagents are used as the solute with the molar ratio of solute:fluxing agent=5:2, the molar ratio of $A_2CO_3$ (A=K, Rb, Cs, $NH_4$ $NH_4$)/$H_3BO_3$/$NH_4H_2PO_4$ was selected at 5/16/16. Then, mixed the said reagents with fluxing agent and put into a (P 80 mm×80 mm lidless platinum crucible which was placed in the center of a vertical, programmable temperature furnace, was heated at 550° C., held at this temperature for 60 h, and then quickly cooled to the initial crystallization temperature (530° C.).

The temperature was decreased to room temperature at a rate of 3.5° C./h to obtain the seeds.

A seed crystal of $A_3B_{11}P_2O_{23}$ (A=K, Rb, Cs, $NH_4$) was attached with Pt wire to a Pt rod and then suspended on solution at 530° C. for 15 minutes. The seed crystal was kept at this temperature in solution for half an hour while rotating at a rate of 10 rpm. The temperature of the furnace was first lowered quickly to 515° C. and then lowered at a rate of 3° C./day. After the growth of crystal ended, the crystal was lifted out of liquid surface. The temperature of the crystal was then lowered to room temperature at a rate of 1° C./h. As a result, transparent $A_3B_{11}P_2O_{23}$ (A=K, Rb, Cs, $NH_4$) crystal with a size of 25 mm×24 mm×10 mm was obtained.

Embodiment 10

$A_3B_{11}P_2O_{23}$ (A=K, Rb, Cs, $NH_4$) polycrystalline powder was prepared according to a reaction formula: 6AOH (A=K, Rb, Cs, $NH_4$)+11$B_2O_3$+2$P_2O_5$→2$A_3B_{11}P_2O_{23}$ (A=K, Rb, Cs, $NH_4$)+3$H_2O\uparrow$ as follows:

Reagents were weighed according to stoichiometric proportion, preparation of $A_3B_{11}P_2O_{23}$ (A=K, Rb, Cs, $NH_4$) crystal by fluxing agent method: $ABF_4$-$MoO_3$ as the fluxing agent system, the said reagents are used as the solute with the molar ratio of solute:fluxing agent=9:3, the molar ratio of $ABF_4$/$MoO_3$ was selected at 4/7. Then, mixed the said reagents with fluxing agent and put into a Φ 80 mm×80 mm lidless platinum crucible which was placed in the center of a vertical, programmable temperature furnace, was heated at 450° C., held at this temperature for 60 h, and then quickly cooled to the initial crystallization temperature (400° C.).

The temperature was decreased to room temperature at a rate of 3.5° C./h to obtain the seeds.

A seed crystal of $A_3B_{11}P_2O_{23}$ (A=K, Rb, Cs, $NH_4$) was attached with Pt wire to a Pt rod and then suspended on solution at 405° C. for 15 minutes. The seed crystal was kept at this temperature in solution for half an hour while rotating at a rate of 10 rpm. The temperature of the furnace was first lowered quickly to 400° C. and then lowered at a rate of 3° C./day. After the growth of crystal ended, the crystal was lifted out of liquid surface. The temperature of the crystal was then lowered to room temperature at a rate of 1° C./h. As a result, transparent $A_3B_{11}P_2O_{23}$ (A=K, Rb, Cs, $NH_4$) crystal with a size of 25 mm×24 mm×10 mm was obtained.

Embodiment 11

$A_3B_{11}P_2O_{23}$ (A=K, Rb, Cs, $NH_4$) polycrystalline powder was prepared according to a reaction formula: 12$AH_2PO_4$ (A=K, Rb, Cs, $NH_4$)+22$H_3BO_3$+2$P_2O_5$→4$A_3B_{11}P_2O_{23}$ (A=K, Rb, Cs, $NH_4$)+33$H_2\uparrow$+8$H_3PO_4$ as follows:

a. Reagents were weighed according to stoichiometric proportion, and loaded into a 100 mL Teflon-lined autoclave, further added 50 g $H_3BO_3$ to obtain the mixed liquid.

b. The mixture was loaded into Teflon-lined autoclave and subsequently sealed;

c. The autoclave was heated to 180° C. at a rate of 20° C./h, held at this temperature for 10 days, and then cooled to room temperature at a rate of 4° C./h;

d. Open the autoclave and filter the solution containing crystals to obtain a transparent alkali metal borophosphates compounds.

Embodiment 12

$A_3B_{11}P_2O_{23}$ (A=K, Rb, Cs, $NH_4$) polycrystalline powder was prepared according to a reaction formula: 6ACl (A=K, Rb, Cs, $NH_4$)+11$B_2O_3$+4$NH_4H_2PO_4$→2$A_3B_{11}P_2O_{23}$ (A=K, Rb, Cs, $NH_4$)+6HCl$\uparrow$+4$NH_3\uparrow$+3$H_2O\uparrow$ as follows:

a. Reagents were weighed according to stoichiometric proportion, and loaded into a 21 mL Teflon-lined autoclave, further added 0.1 g $H_3BO_3$ to obtain the mixed liquid.

b. The mixture was loaded into Teflon-lined autoclave and subsequently sealed;

c. The autoclave was heated to 160° C. at a rate of 10° C./h, held at this temperature for 11 days, and then cooled to room temperature at a rate of 4° C./h;

d. Open the autoclave and filter the solution containing crystals to obtain a transparent alkali metal borophosphates compounds.

Embodiment 13

$A_3B_{11}P_2O_{23}$ (A=K, Rb, Cs, $NH_4$) polycrystalline powder was prepared according to a reaction formula: 6ACl (A=K, Rb, Cs, $NH_4$)+22$H_3BO_3$+2$P_2O_5$→2$A_3B_{11}P_2O_{23}$ (A=K, Rb, Cs, $NH_4$)+6HCl↑+30$H_2O$↑ as follows:

Reagents were weighed according to stoichiometric proportion, and then the mixture was placed in a beaker (10 mL), further add 0.1 mL deionized water into the beaker and stirred until dissolved completely. Then put the beaker on the heating table and heat it to 400° C. After 7 days, the series of alkali metal borophosphates nonlinear optical crystals are obtained. In order to further grow them, the seed crystals of the series of crystals were suspended in solution with fine platinum wires. In order to reduce the evaporation of water, the beaker is covered with a layer of polyethylene plate and pierced with dozens of millimeter sized holes. After 5 weeks, take out a centimeter size alkali metal borophosphate nonlinear optical crystal from the solution.

Embodiment 14

Figure 4:
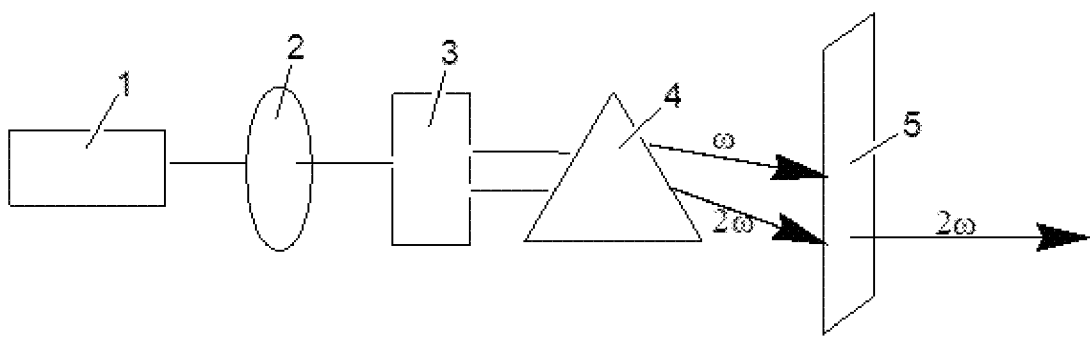
FIG. 4 is a working schematic diagram of a nonlinear optical apparatus manufactured from $A_3B_{11}P_2O_{23}$ (A=K, Rb, Cs, $NH_4$) crystal of the present invention, where 1 is the laser generator, 2 is the incident laser beam, 3 is post-treated and optically fabricated $A_3B_{11}P_2O_{23}$ (A=K, Rb, Cs, $NH_4$) NLO devices, 4 is a output beam and 5 is a filter.

Any $K_3B_{11}P_2O_{23}$, $Rb_3B_{11}P_2O_{23}$, $Cs_3B_{11}P_2O_{23}$, and $(NH_4)_3B_{11}P_2O_{23}$ nonlinear optical crystals obtained according to embodiments 1 to 13 were mounted on the position of 3 as shown in FIG. 4; a Q-switched Nd: YAG laser device was taken as a light source with an incident wavelength of 1064 nm at the room temperature came into $K_3B_{11}P_2O_{23}$, $Rb_3B_{11}P_2O_{23}$, $Cs_3B_{11}P_2O_{23}$, and $(NH_4)_3B_{11}P_2O_{23}$ single crystal 3 to generate frequency-doubled laser with a wavelength of 532 nm; and an outgoing beam 4 contained infrared lights with wavelengths of 1064 nm and 532 nm, and frequency-doubled laser with a wavelength of 532 nm was obtained after the light was filtered by a light filter 5.

Embodiment 15

Any $K_3B_{11}P_2O_{23}$, $Rb_3B_{11}P_2O_{23}$, $Cs_3B_{11}P_2O_{23}$, and $(NH_4)_3B_{11}P_2O_{23}$ nonlinear optical crystals obtained according to embodiments 1 to 13 were mounted on the position of 3 as shown in FIG. 4; a Q-switched Nd: YAG laser device was taken as a light source with an incident wavelength of 532 nm at the room temperature came into $K_3B_{11}P_2O_{23}$, $Rb_3B_{11}P_2O_{23}$, $Cs_3B_{11}P_2O_{23}$, and $(NH_4)_3B_{11}P_2O_{23}$ single crystal 3 to generate frequency-doubled laser with a wavelength of 266 nm; and an outgoing beam 4 contained infrared lights with wavelengths of 532 nm and 266 nm, and frequency-doubled laser with a wavelength of 266 nm was obtained after the light was filtered by a light filter 5.

Embodiment 16

Any $K_3B_{11}P_2O_{23}$, $Rb_3B_{11}P_2O_{23}$, $Cs_3B_{11}P_2O_{23}$, and $(NH_4)_3B_{11}P_2O_{23}$ nonlinear optical crystals obtained according to embodiments 1 to 13 were subjected to directional cutting and polishing processing to form a single crystal device. A 1064 nm Nd: YAG Q-switched laser source was used as a pump source to generate a laser output with a wavelength shorter than 266 nm.

What is claimed is:

1. An alkali metal borophosphates nonlinear optical crystals having a chemical formula of $A_3B_{11}P_2O_{23}$ wherein A=K, Rb, Cs and/or $NH_4$, and the alkali metal nonlinear optical crystals is selected from $K_3B_{11}P_2O_{23}$, $Rb_3B_{11}P_2O_{23}$, $Cs_3B_{11}P_2O_{23}$, and $(NH_4)_3B_{11}P_2O_{23}$, which belong to a rhombohedral crystal system, and have a space group of R3 with unit-cell parameters a=b in the range from 10.016(5) Å to 12.591(5) Å, c in the range from 12.105(6) Å to 14.905(6) Å, Z=3.

2. A method for synthesizing alkali metal nonlinear optical crystals as claimed in claim 1, the method comprising synthesizing the alkai metal nonlinear optical crystals by a high-temperature solid-state reaction method, a hydrothermal method, or a solution method.

3. The method according to claim 2, wherein the high-temperature solid-state reaction method comprises the following steps: $A_3B_{11}P_2O_{23}$ wherein A=K, Rb, Cs, and/or $NH_4$ compounds or a mixture of the $A_3B_{11}P_2O_{23}$ wherein A=K, Rb, Cs, and/or $NH_4$ compounds with a fluxing agent is heated to obtain a mixed melt or directly heat a mixture of an A-containing compound wherein A=K, Rb, Cs, $NH_4$, a boron-containing compound and a phosphorus-containing compound or a mixture of A-containing compound wherein A=K, Rb, Cs, $NH_4$, the boron-containing compound, the phosphorus-containing compound and and fluxing agents to obtain a mixed melt; placing the mixed melt in a crucible in a crystal growth furnace to cool down the temperature, and then a seed rod is lifted out of the liquid surface before the melt solidifies to obtain a seed crystal; the seed crystal is fixed on the seed rod, and the seed crystal is brought down to the liquid surface of the mixed melt or in the mixed melt for melting back to the saturation temperature; and cooling or maintaining a constant temperature to grow the crystal to obtain the alkali metal borophosphates $A_3B_{11}P_2O_{23}$ wherein A=K, Rb, Cs, $NH_4$ nonlinear optical crystals;

wherein the hydrothermal method comprises the following steps: $A_3B_{11}P_2O_{23}$ wherein A=K, Rb, Cs, and/or $NH_4$ compounds or a mixture of the $A_3B_{11}P_2O_{23}$ wherein A=K, Rb, Cs, and/or $NH_4$ compounds with a mineralizer; or directly mixing the A-containing compound wherein A=K, Rb, Cs, and/or $NH_4$, the boron-containing compound and the phosphorus-containing compound or the mixture of A-containing compound wherein A=K, Rb, Cs, and/or $NH_4$, the boron-containing compound, the phosphorus-containing compound and the mineralizer to obtain a mixed melt; the mixture is combined with deionized water, and the resulting mixture is loaded into an autoclave; the autoclave is heated, and then cooled to room temperature; filtering the solution containing crystals to obtain the transparent alkali metal borophosphates $A_3B_{11}P_2O_{23}$ wherein A=K, Rb, Cs, and/or $NH_4$ nonlinear optical crystals;

wherein the solution method comprises the following steps: $A_3B_{11}P_2O_{23}$ wherein A=K, Rb, Cs, and/or $NH_4$ compounds or a mixture of the $A_3B_{11}P_2O_{23}$ wherein A=K, Rb, Cs, and/or $NH_4$ compounds with a cosolvent; or directly mixing the A-containing compound wherein A=K, Rb, Cs, and/or $NH_4$, the boron-containing compound and the phosphorus-containing compound or the mixture of A-containing compound wherein A=K, Rb, Cs, and/or $NH_4$, the boron-containing compound, the phosphorus-containing compound and the cosolvent to obtain a mixed melt; the mixture is dissolved in deionized water and placed in a beaker stirred until dissolved completely; placing the beaker on the heating table to heat for a period of time to obtain a series of alkali metal borophosphates nonlinear optical; to further grow the crystals, the seed crystals of the series of crystals are suspended in solution with fine platinum wires; to reduce the evaporation of water, the beaker is covered with a layer of polyethylene plate and pierced with dozens of millimeter sized holes; and after a period of time, take out a centimeter size alkali metal borophosphates $A_3B_{11}P_2O_{23}$ wherein A=K, Rb, Cs and/or $NH_4$ nonlinear optical crystals from the solution.

4. The method according to claim 3, based on the following specific operation steps:

the high-temperature solid-state reaction method is used to prepare $A_3B_{11}P_2O_{23}$, wherein A=K, Rb, Cs, and/or $NH_4$ nonlinear optical crystals; wherein the series of alkali metal borophosphates compounds and the fluxing agent are in a ratio of 1:1-20, or a molar ratio of the A-containing compound wherein A=K, Rb, Cs, and/or $NH_4$, the boron-containing compound, the phosphorus-containing compound and the fluxing agent is 2.5-3.5: 10.5-11.5:1.5-2.5:1-20; wherein the fluxing agents include at least one or more of alkali metal salts, which are selecte from the group consisting of alkali metal carbonates, alkali metal nitrates, alkali metal sulfates, alkali metal oxalates, alkali metal borates, alkali metal phosphates, alkali metal halides, alkali metal fluoroborates, alkali metal metaborates, and alkali metal oxides, alkali metal hydroxides, and monohydrogen phosphates, dihydrogen phosphates, boron oxide, boric acid, phosphoric acid, lead oxide, lead fluoride, molybdenum oxide, bismuth oxide;

the hydrothermal method is used to prepare $A_3B_{11}P_2O_{23}$, wherein wherein A=K, Rb, Cs and/or $NH_4$ nonlinear optical crystals; wherein the series of alkali metal borophosphates compounds and the mineralizer are in a ratio of 1:0-10 or a molar ratio of the A-containing compound wherein A=K, Rb, Cs and/or $NH_4$, the boron-containing compound, the phosphorus-containing compound and the fluxing agent is 2-4:10-12:1-3: 1-10; wherein the mineralizer include at least one or more of AOH, $A_2O$, AF, ACl, ABr, $ABF_4$, $A_3PO_4$, $A_3BO_3$, $ANO_3$, $A_2C_2O_4$ $A_2CO_3$, $AHCO_3$, $A_2SO_4$, $A_2HPO_4$, $AH_2PO_4$, $B_2O_3$, wherein A=K, Rb, Cs, $NH_4$;

the solution method is used to prepare $A_3B_{11}P_2O_{23}$, wherein wherein A=K, Rb, Cs and/or $NH_4$ nonlinear optical crystals, wherein the series of alkali metal borophosphates compounds and the cosolvent are in a ratio of 1:0-30; or a molar ratio of the A-containing compound wherein A=K, Rb, Cs and/or $NH_4$, the boron-containing compound, the phosphorus-containing compound and the fluxing agent is 2.5-3.5:10.5-11.5:1.5-2.5:1-30; wherein the cosolvents are self-cosolvents.

* * * * *